UNITED STATES PATENT OFFICE.

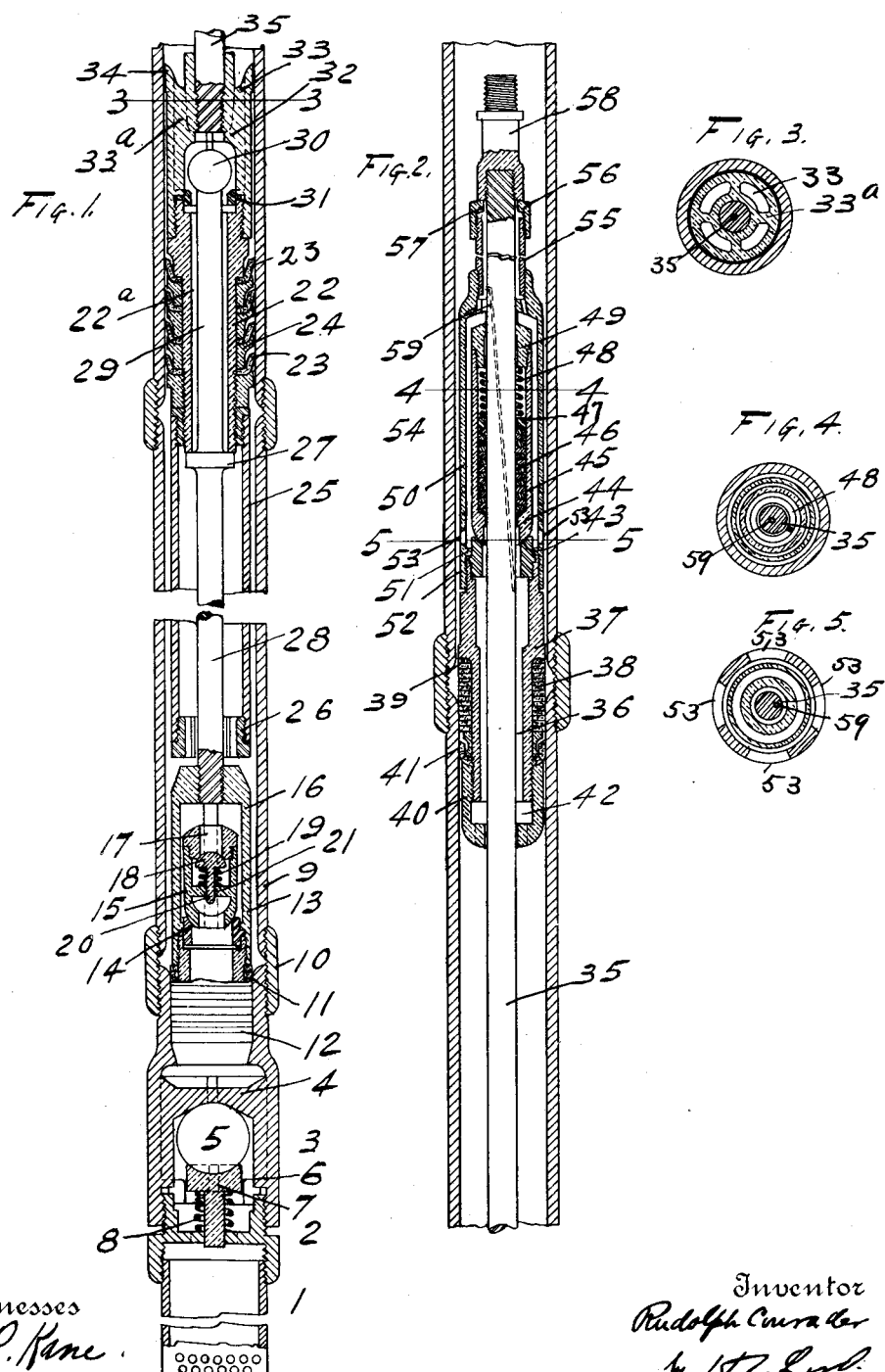

RUDOLPH CONRADER, OF ERIE, PENNSYLVANIA.

PUMP.

1,066,798.

Specification of Letters Patent.

Patented July 8, 1913.

Application filed September 8, 1908. Serial No. 451,974.

*To all whom it may concern:*

Be it known that I, RUDOLPH CONRADER, a citizen of the United States, residing at Erie, in the county of Erie and State of Pennsylvania, have invented new and useful Improvements in Pumps, of which the following is a specification.

This invention relates to pumps, and consists in certain improvements in the construction thereof as will be hereinafter fully described and pointed out in the claims.

In some respects the present invention is in the nature of an improvement of the construction shown and described in my former Patent #1,031,248 dated July 2, 1912. In that patent, I have shown a closure above the plunger; a rod extending through the closure to the plunger and in connection with this a means for compensating for the displacement of the plunger rod by placing a relief valve on the standing valve. I have also shown in that patent in connection with the foregoing mechanism a strainer below the working barrel. I have also shown in that patent a plunger in the working barrel with a closure above the plunger, the plunger rod extending through the closure secured to the plunger and an open sand trap above the plunger and below the closure, carried by the plunger, the top of the sand trap forming a sliding fit with the working barrel with discharge openings in the bottom of the sand trap through which liquid passes, the sand trap being disclosed therein and claimed broadly in connection with the other devices just hereinbefore specified. The sand trap there disclosed is also arranged as a continuation of the plunger and has a continuous opening along the top of its surrounding walls. It is arranged with a valve in the trap and cage. It has a web connecting the walls of the sucker rod with the trap and cage. The disclosure in said patent also has a sand trap above the closure comprising a sand trap tube secured to the closure and extending along the rod forming a chamber between its walls and the walls of the rod, the plunger rod extending through a gland on the closure, the said sand trap tube having openings through which liquid is pumped, said openings being near the bottom of the tube, said sand trap tube being arranged to receive the liquid from the closure, the well tubing in that structure being larger than the sand trap tubing so as to form a space between the sand trap tubing and the well tubing to form a chamber for giving capacity to the said trap. I do not, therefore, claim broadly these features in this application.

The invention is illustrated in the accompanying drawings as follows:

Figure 1 shows a central vertical section of the lower part of the pump. Fig. 2 a similar section of the parts immediately above those shown in Fig. 1. Fig. 3 a section on the line 3—3 in Fig. 1. Fig. 4 a section on the line 4—4 in Fig. 2. Fig. 5 a section on the line 5—5 in Fig. 2.

1 marks the usual strainer. This is connected by a coupling 2 with a valve fitting 3. The valve fitting has the cage 4 arranged in it in which is arranged the valve ball 5. The valve ball 5 operates upon the seat 6, and is normally maintained in an open position by the support 7; the support 7 being held normally in its upper position by the spring 8.

The working barrel 9 is connected with the valve fitting 3 by the coupling 10. The upper end of the valve fitting is beveled at 11 to receive the packing 12 at the bottom of the standing valve 13. The standing valve 13 is provided with the seat 14. The valve check 15 is arranged in the cage 16. The check has the passage 17 through it. This passage is yieldingly closed by a valve 18. A spring 19 is arranged around the stem 20 of the valve 18, and normally holds it in its closed position, the spring being tensioned between the valve and the spider 21 in the check.

It will be understood that when the plunger is in its upper position and has drawn in a full charge of liquid to the barrel below the plunger, all the space in the barrel both above and below the plunger is occupied by the liquid. Upon the downward stroke of the plunger, the length of plunger rod below the closure is increased to the extent of the length of the stroke. Ordinarily, these liquids have no elasticity and this added displacement of the plunger rod must be taken care of in some manner. In this case, it is taken care of by the relief valve on the standing valve. On the downward stroke of the plunger, the liquid is forced from below the plunger to above the plunger in a quantity sufficient to fill the chamber created above the plunger. The amount of liquid passing through the plunger will be the capacity of the working barrel in the length of the stroke of the plunger less a volume of liquid equal to that displaced by the plunger rod. A volume of liquid equal to that displaced by the plunger rod will be forced through the relief valve. If this relief valve were not provided and there were no gas in the liquid, the pump would be blocked as soon as the air had been expelled from it because on the downward stroke of the plunger, the volume displaced by the plunger rod could not escape.

The plunger 22 is provided with the cups 23 and securing nuts 24. It has a passage 22ª through it through which the liquid normally passes. The extension 25 is secured to the lower end of the plunger and projects down into the extension of or lower part of the working barrel. It has an internal shoulder 26 at its lower end adapted to engage the shoulder 27 on the rod 28. The rod 28 is secured to and extends upwardly from the standing valve 13. In the normal operation of the pump, the shoulder 27 does not come in contact with the shoulder 26, but when the plunger is withdrawn the shoulder 26 engages the shoulder 27 and lifts the standing valve with the plunger.

A rod 29 is formed as an extension of the rod 28 and projects upwardly through the opening 22ª in the plunger a sufficient distance to engage the check valve 30 of the plunger valve when the plunger is in its lowermost position. The purpose of this is to permit of the draining of the parts above the plunger when the pump is brought to rest. This is peculiarly desirable in the construction shown, in that the valve 18 permits the escape of liquid as soon as bearing pressure is exerted upon it, and the valve 5 permits the escape of liquid past it, except when there is a rush of liquid incident to withdrawing the plunger with a column of liquid above it.
A valve seal 31 is arranged in the plunger, and is operated upon by the check ball 30. The check ball is arranged in the crown or cage 32, and this crown or cage comprises a cup 33, forming a sand trap. The edges 34 of this cup form a nice sliding fit with the working barrel, and thus prevent the working of sand or other material to the lower part of the plunger. The cup 33 has the webs 33ª to which the sucker rod 35 is attached, the webs having passages between them through which the liquid is discharged from the cup. The webs do not extend to the top of the cup so that the top of the cup forms a continuous opening into which the sand may be precipitated.

A rod 35 is secured to the crown 33, and extends normally through a passage 36 in a closure plug 37. The closure plug has the packing 38 which is adapted to enter the upper end of the working barrel, so as to prevent a passage of liquid from above the working barrel outside the plug to the working barrel. The packing 38 is put under tension against a shoulder 39 by the spider 40 screwed onto the end of the plug. The cup 41 is preferably interposed between the packing and the spider to supplement the packing for making a closure. The spider has the passages 42 through it connecting with the passage 36.

A valve seat 43 is arranged on the upper end of the plug 37, and is operated upon by the check 44. The check 44 surrounds the rod 35, and has in it a gland 45 in which is arranged a packing 46. A follower 47 is arranged in the packing, and a spring 48 exerts pressure on the follower, so that the packing is subjected to pressure, and this pressure continues as the packing contracts by the expansion of the spring. The spring is put under tension by the cap 49 which is screwed into the gland 45. This construction of check assures a closure against the passage of liquid through the joint formed between the check and the rod. When it is realized that this valve is subjected to very high pressure, it will be understood that this is important.

The valve check 44 is arranged in the cage 50. This cage has a shoulder 51 near its lower end which engages the valve seat 43. The cage also has the screw threaded end 52 which is screwed onto the end of the plug 37, thus securing the cage, and also the valve seat. The cage has the passages 53 through it forming a means of communication between the cage and the tubing. These passages are preferably below the top of the valve, and so arranged as to prevent an inflow of sand to the joint at the top of the valve. They also preferably extend below the valve seat, so that this is cleared by the moving liquid.

The cage 50 has the extension 55 which extends upwardly along the rod 35 a sufficient distance to make the chamber formed between it and the cage and the walls of the tubing of sufficient length or capacity to retain any deposit of sand that may accumulate in the column of liquid above it, so as to prevent the packing of sand around the rod 35. The upper end of the extension 55 is preferably closed by a cap 56 having an opening 57 formed for the passage of the rod 35. The sucker rod coupling 58 is secured to the rod 35.

A small passage 59 (see dotted lines in Fig. 2), extends through the rod 35 from a point above the valve 44 to a point below the same when the rod is in its lowermost position. This permits the liquid above the plunger to slowly drain past the closure, and inasmuch as the plunger valve is open with the plunger in this position, the entire column of liquid in the tubing thus slowly drains back into the well without violently agitating the liquid in the well.

I am aware that valves surrounding the plunger rod have been used especially in pumps particularly designed for use in wells when the liquid carries large quantities of gas, or in which the pumping is so conducted that only a partial charge is actuated with each reciprocation of the pump. Such a construction is shown in Patent 44,610 to Crocker, Oct., 11th, 1864. In the construction referred to, a certain amount of elasticity in the fluid is not only desirable but necessary and for this reason the expulsion of air or gas from the working chambers of the pump is unimportant. When however the pump is operated to take a full charge at each reciprocation, and provision is made as with the yielding valve 18 compensating for the differences in the capacity of chambers above and below the plunger by reason of the plunger rod, the trapping of air becomes a very disturbing factor. It will be understood in this connection, that upon the downward stroke of the plunger, if any air is trapped in the chamber above the plunger a very slight compression of this air will serve to operate the yielding valve 18. While with the upward or forcing stroke of the plunger, this air must necessarily be put under very high compression before movement from the air chamber is effected. By placing the valve at the top of the chamber formed between the closure and the plunger as in the present invention the possibility of trapping air is eliminated.

It will be noted that it is possible where the yielding valve offers but slight resistance to the discharge of liquid, that with a deep well it will be possible to trap sufficient air in the pump chamber to stop the action of the pump because the air pressure will be at all times sufficient to prevent the opening of the plunger valve, and the liquid below the plunger following the line of least resistance will pass out of the yielding valve on the downward stroke of the plunger instead of upwardly through the plunger. Upon the upward stroke of the plunger this air is simply compressed, but there is not enough pressure to overcome the column of liquid. In my former application, I used an open top sand trap cup forming a cage for the plunger valve and in that application the rod secured to the web in the cup formed a discharge passage from the cup, the result being that the sand was first expelled from the cup to the pump chamber and then drawn up through the cup to the discharge tube. In the present application, this rod is solid and the passage of liquid from the plunger cup forming the valve cage is at all times through the cup.

What I claim as new is:

1. In a pump, the combination of a working barrel; a plunger operating in the barrel; a valved closure above the plunger; a plunger rod secured to the plunger and extending through the closure; a standing valve; and a yielding valve in the lower part of the barrel for permitting a discharge of liquid on the downward stroke of the plunger to compensate for the displacement of the plunger rod on the downward stroke of the plunger.

2. In a pump, the combination of a working barrel; a plunger in the working barrel; a valve seat above the plunger; a rod extending from the working barrel through the seat; a valve surrounding the rod and operating upon the seat; a valve cage surrounding the valve and forming a sand trap; and an extension on the cage surrounding the rod.

3. In a pump, the combination of a working barrel; a plunger in the working barrel; a valve seat above the plunger; a plunger rod extending from the plunger through the seat; and a valve surrounding the rod and operating upon the seat, said rod having an opening extending through it from above the valve to below it only when the plunger is in its lowermost position for the purpose described.

4. In a pump, the combination of a working barrel; a plunger in the working barrel; a closure above the plunger; a rod extending through the closure; means for draining the part above the closure into the working barrel below the closure, a plunger valve; means for opening the plunger valve to permit the drainage to continue past the plunger; a valve mechanism below the plunger; and a yielding valve for compensating for the valve rod on the downward stroke of the plunger, said yielding valve permitting drainage past it.

5. In a pump, the combination of a working barrel; a plunger in the working barrel; a standing valve; a rod extending from the standing valve, and having a shoulder thereon; an extension on the plunger having means for engaging said shoulder when the plunger is lifted above the normal, said extension having an opening for the passage of liquid at the bottom and being of less diameter than the working barrel to permit of the accumulation of a column of liquid in the space between the extension and the walls of the working barrel; an extension on said rod; and a plunger valve arranged to be opened by said extension with the plunger in its lowermost position.

6. In a pump, the combination of a working barrel; a plunger; a closure above the plunger; a standing valve; a valve preventing a back flow of liquid through the closure; a valve 5 below the standing valve; means for holding said valve normally in an open position; and means for opening the passage through the standing valve to above the closure to permit the drainage of the column of liquid above the closure.

7. In a pump, the combination of a working barrel; a plunger operating in the barrel; a closure above the plunger forming a chamber between the plunger and the closure; valves controlling the movement of liquid to and from the chamber as the plunger is reciprocated, the movement of liquid from the chamber being at all times from the top of the chamber; and a plunger chamber forming a sand trap cup at the top of the plunger through which the liquid passes on its entrance to the chamber.

8. In a pump, the combination of a working barrel; a sand trap cup forming a sliding fit with the working barrel; a closure above the cup forming a chamber between the cup and the closure; and valves controlling the movement of liquid to and from the chamber as the cup is reciprocated, the discharge of the liquid from the chamber and to the chamber through the cup being at all times from the top of the chamber.

9. In a pump, the combination of a working barrel; a plunger in the barrel; a sand trap and valve cage forming a continuation of the plunger, and having a continuous opening along the top of its surrrounding walls; a valve in the trap and cage; a closed sucker rod; and a web connecting the sucker rod with the walls of the sand trap and cage.

In testimony whereof I have hereunto set my hand in the presence of two subscribing witnesses.

RUDOLPH CONRADER.

Witnesses:
K. R. KANE,
H. C. LORD.